US009311911B2

(12) United States Patent
Tang et al.

(10) Patent No.: US 9,311,911 B2
(45) Date of Patent: Apr. 12, 2016

(54) METHOD AND APPARATUS FOR LIVE CALL TEXT-TO-SPEECH

(71) Applicant: GOOGLE TECHNOLOGY HOLDINGS LLC, Mountain View, CA (US)

(72) Inventors: Weiqi Tang, Buffalo Grove, IL (US); Kazim A. Das, Buffalo Grove, IL (US); Yi He, Gurnee, IL (US); Ling Jin, Buffalo Grove, IL (US)

(73) Assignee: Google Technology Holdings LLC., Mountain View, CA (US)

( * ) Notice: Subject to any disclaimer, the term of this patent is extended or adjusted under 35 U.S.C. 154(b) by 0 days.

(21) Appl. No.: 14/446,988

(22) Filed: Jul. 30, 2014

(65) Prior Publication Data
US 2016/0035343 A1 Feb. 4, 2016

(51) Int. Cl.
*G10L 13/00* (2006.01)
*G10L 25/48* (2013.01)

(52) U.S. Cl.
CPC ............... *G10L 13/00* (2013.01); *G10L 25/48* (2013.01)

(58) Field of Classification Search
CPC .................... H04M 2201/40; H04M 3/42221; G10L 15/26; G06F 9/4843; H04L 51/00
USPC ........... 704/260; 455/412.1, 416, 552.1, 425, 455/563
See application file for complete search history.

(56) References Cited

U.S. PATENT DOCUMENTS

| 7,013,282 | B2 | 3/2006 | Schrocter |
| 7,117,152 | B1 | 10/2006 | Mukherji et al. |
| 7,212,617 | B2 | 5/2007 | Owens et al. |
| 7,606,352 | B2 | 10/2009 | Cass |
| 7,729,481 | B2 | 6/2010 | Thompson et al. |
| 7,990,964 | B2 | 8/2011 | O'Brien et al. |
| 8,170,537 | B1 | 5/2012 | Bort |
| 8,335,496 | B1 | 12/2012 | Bort |
| 8,583,093 | B1 | 11/2013 | Bort |
| 8,645,575 | B1 | 2/2014 | McKnight et al. |
| 2006/0161426 | A1 | 7/2006 | Ikegami |
| 2007/0260460 | A1 | 11/2007 | Hyatt |
| 2008/0076410 | A1* | 3/2008 | Beyer ............................. 455/425 |
| 2008/0133580 | A1 | 6/2008 | Wanless et al. |
| 2009/0156240 | A1 | 6/2009 | Kirchmeier et al. |
| 2011/0111805 | A1* | 5/2011 | Paquier et al. ................. 455/563 |
| 2014/0273974 | A1* | 9/2014 | Varghese et al. ........... 455/412.1 |

OTHER PUBLICATIONS

Automated Text to Speech Phone Calls, RoboCalling & RoboTexting Experts, https://www.robotalker.com/robo-calls/text-to-speech-phone-calls.aspx?language=en-us, downloaded from the internet: Apr. 14, 2014, all pages.

(Continued)

*Primary Examiner* — Charlotte M Baker
(74) *Attorney, Agent, or Firm* — Fish & Richardson P.C.

(57) ABSTRACT

A method and apparatus provide live call text-to-speech. The method can include entering an ongoing voice call at a first communication device with a second communication device. The method can include receiving text input at the first communication device during the ongoing voice call. The method can include converting the text input to speech during the ongoing voice call to generate a text-to-speech audible signal. The method can include sending the text-to-speech audible signal from the first communication device to the second communication device during the ongoing voice call.

20 Claims, 7 Drawing Sheets

(56) References Cited

OTHER PUBLICATIONS

AfterVoice.com, After Voice—Free Text to Phone Call with Selectable Voices, http://www.aftervoice.com/, downloaded from the Internet: Apr. 14, 2014, all pages.

* cited by examiner

METHOD AND APPARATUS FOR LIVE CALL TEXT-TO-SPEECH

BACKGROUND

1. Field

The present disclosure is directed to a method and apparatus for live call text-to-speech. More particularly, the present disclosure is directed to converting text to speech during an ongoing voice call.

2. Introduction

Presently, communication devices allow users to place and receive voice calls between the communication devices. These communication devices include cell phones, flip phones, smartphones, smart watches, and other communication devices that provide for voice calls. For example, a user can use a phone application on a smartphone to place a phone call to another user's remote communication device so the users can speak with each other.

Often times there are scenarios during an ongoing phone call where one user in the call is not able to speak, but can still can hear the audio from the remote communication device. For example, the user may be wearing a wireless headset while in a meeting, where the user can hear the other party in the call, but should not speak to avoid distracting other people in the meeting. The user may also have temporarily or permanently lost their voice. Additionally, the user may be in a public place, but may want to be discreet about the communication. The user may further be at a location with loud ambient noise that makes it difficult for the remote party to hear the user. In such situations, the user may want to keep the call active and continue communicating. Unfortunately, the user cannot continue communicating in a voice call if the user cannot speak while in the voice call.

Thus, there is a need for a method and apparatus for live call text-to-speech.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for live call text-to-speech. The method can include entering an ongoing voice call at a first communication device with a second communication device. The method can include receiving text input at the first communication device during the ongoing voice call. The method can include converting the text input to speech during the ongoing voice call to generate a text-to-speech audible signal. The method can include sending the text-to-speech audible signal from the first communication device to the second communication device during the ongoing voice call.

Figure 1:
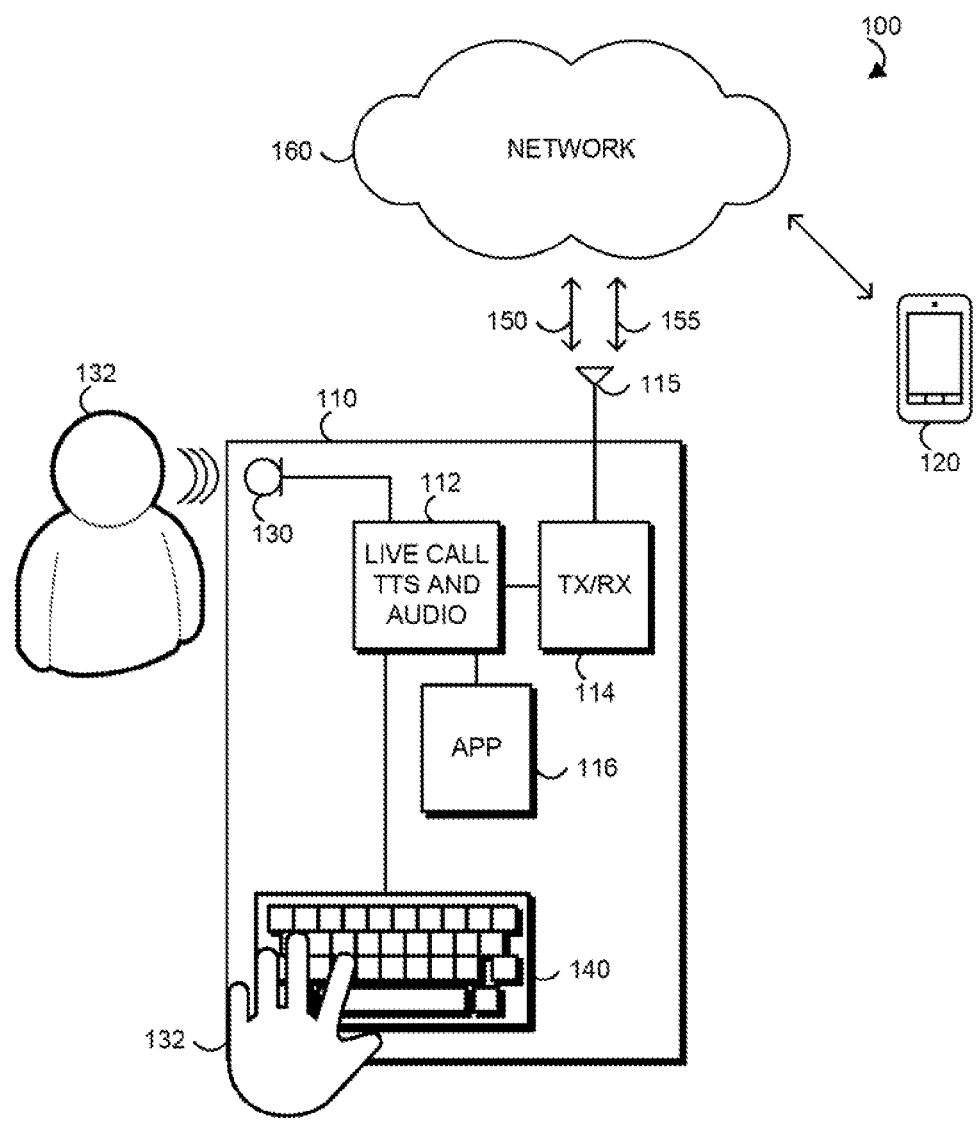
FIG. 1 is an example block diagram of a system according to a possible embodiment.

FIG. 1 is an example block diagram of a system 100 according to a possible embodiment. The system 100 can include a first apparatus 110, a second apparatus 120, and a network 160. The first apparatus 110 can include an audio input 130, such as a microphone, a transducer, and/or other audio input. The first apparatus 110 can also include a text input 140, such as a physical keypad, a physical keyboard, an alphanumeric input, a virtual keypad or keyboard on a display, and/or any other text input. The first apparatus 110 can include a transceiver 114 and an antenna 115. The transceiver 114 can be a wireless transceiver that uses the antenna 115 or a wired transceiver that uses a physical connection for communication. The apparatus 110 can include a live call text-to-speech audio module 112 and an application 116. The text-to-speech audio module 112 can be hardware, can be software, can be an application, or can be any other means of receiving text and converting it to speech.

The first apparatus 110 and/or the second apparatus 120 can be wireless terminals. For example, the apparatus 110 can be a portable wireless communication device, a smartphone, a cellular telephone, a personal digital assistant, a personal computer, a selective call receiver, a tablet computer, or any other device that is capable of sending and receiving communication signals on a network. The apparatus 110 can communicate with the network 160 and other devices using wireless communication signals, such as cellular or wireless local area network communication signals, as well as electrical communication signals, optical communication signals, or other wireless communication signals as well as wired communication signals.

The network 160 may include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a packet-based data network, the Internet, an intranet, a wireless wide area network, a wireless local area network, a wired communication network, and other communications systems. The network 160 may include more than one network and may include a plurality of different types of networks. Thus, the network 160 may include a plurality of data networks, a plurality of telecommunications networks, a combination of data and telecommunications networks and other communication systems capable of sending and receiving communication signals.

According to a possible embodiment, the first apparatus 110 can enter an ongoing voice call with a second apparatus 120. The first apparatus can receive voice communications from the user 132 via the audio input 130 during the ongoing voice call. The first apparatus 110 can also receive text input during the ongoing voice call. For example, the first apparatus 110 receive the text input from a user input from a user 132 on a physical or virtual alphanumeric keypad 140. The text input can also be received via a copy and paste function, such as from an application 116. The text input can additionally be received from an application 116 that otherwise shares information with the live call text-to-speech audio module 112. For example, the text input can be location data received from a map application or can be translated text from a translator application, such as the application 116. A translator application can further receive voice audio, convert the voice audio to text, translate the text, and convert the text to audio. The resulting translated text can then be received as text input from the translator application.

The first apparatus 110 can convert the text input to speech during the ongoing voice call to generate a text-to-speech audible signal. For example, the live call text-to-speech audio module 112 can convert the text input to speech signal during the ongoing voice call. The first apparatus 110 can send the text-to-speech audible signal to the second communication device 120 during the ongoing voice call. For example, the first apparatus 110 can communicate with the second apparatus 120 by connecting to the network 160. The connection with the network 160 can include a voice communication path 150 and a data communication path 115 and the first apparatus 110 can send the text-to-speech audible signal to the second apparatus 120 over the voice communication path 150. The first apparatus 110 can send the text-to-speech audible signal to the second apparatus 120 over any other connection, virtual or actual, that sends voice communications to the second apparatus 120 during an ongoing voice call.

According to a possible embodiment, text-to-speech can be used with audio mixing during a live phone call where one party of the call is not able to speak, can hear the other party, and still wants to keep the call alive and continue communicating. For example, it may be inappropriate for a user to speak while attending a meeting even though the user is on a separate voice call and hearing audio from the other calling party over a headset. As another example, the user may have lost their voice temporarily or permanently, but still may wish to communicate over a voice call. As a further example, the user can be in public place and can want to be discreet about the voice communication. As an additional example, the user may be in an environment, such as at a concert or in a windy location, where ambient noise makes the user's voice difficult to hear over a voice call. In such situations, after a phone call is established, the user can choose to switch a phone application to a live call text-to-speech audio mode, such as a discreet mode. In this mode, the phone application and user interface on the apparatus 110 can change and allow the user to input text using the keypad 140. The apparatus 110 can automatically convert the inputted text to speech using an in-built text-to-speech engine and can inject the resulting converted text to audio stream into the live phone call. A user at the remote apparatus 120 can continue responding, such as by talking, as normal while the user 132 operates the apparatus 110 in discreet mode.

Figure 2:
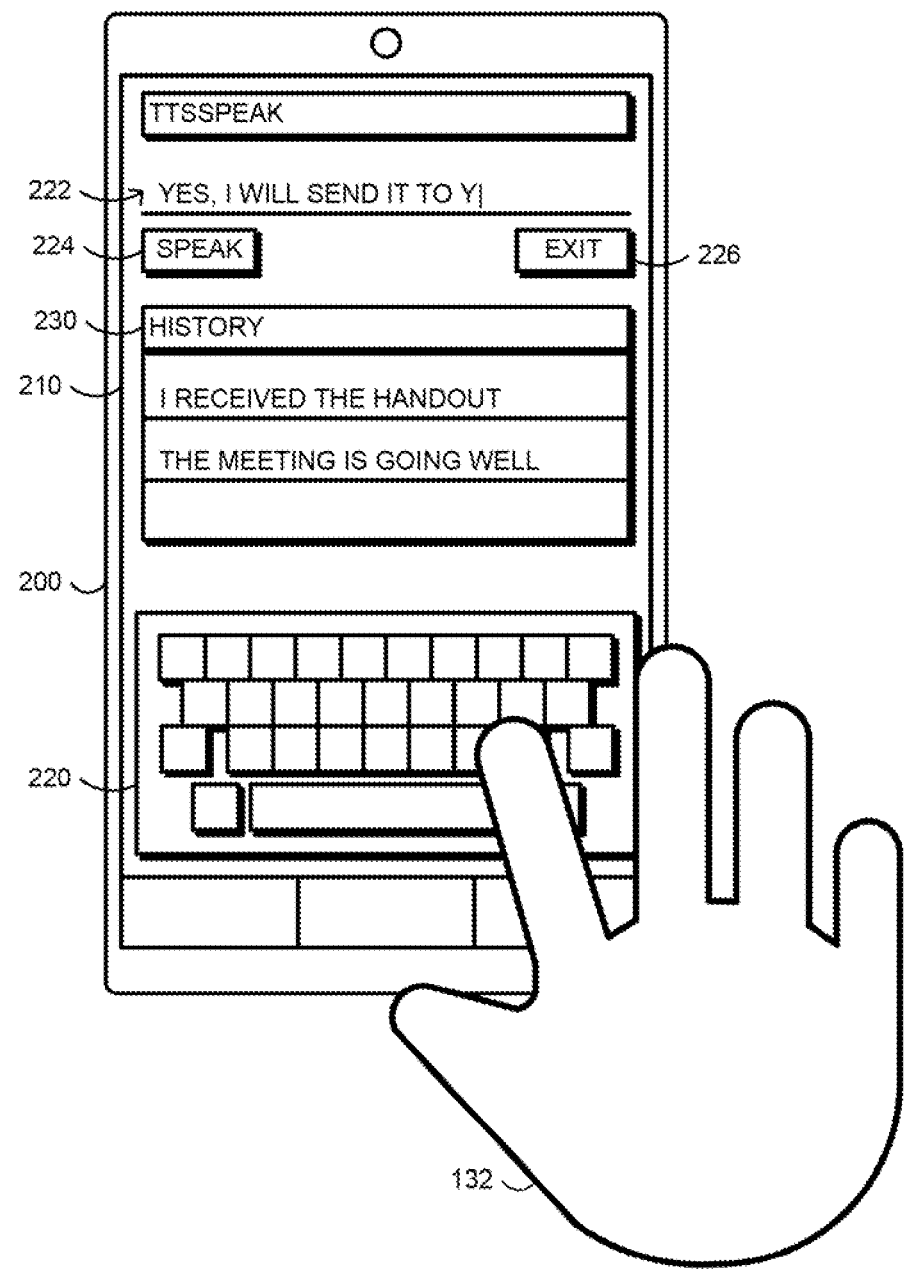
FIG. 2 is an example illustration of an apparatus according to a possible embodiment.

FIG. 2 is an example illustration of an apparatus 200, such as the apparatus 110, according to a possible embodiment. The apparatus 200 can include a display 210 and a text input 220. The text input 220 can be a physical text input, such as a keyboard or keypad. The text input 220 can also be a virtual text input, such as a virtual keyboard, virtual keypad, handwriting recognition area, and/or other virtual text input on the display 210. The display 210 can display inputted text 222, a speak icon 224, and exit icon 226, and a text input history 230.

In operation, during a live call text-to-speech audio mode, such as a Text-To-Speech Speak (TTSSpeak) mode, a user 132 can input text on the text input 220. The display 210 can display the inputted text 222. The display 210 can also display a previously inputted text history 230. After the user 132 inputs the text 222, the user can actuate the speak icon 222 to convert the text to audio and send the resulting audio over an ongoing voice call. Alternately, the user 132 can use any other method of entering and sending text, such as by pressing an enter key or by using any other useful text entry completion input. The user 132 can exit the live call text-to-speech audio mode using the exit icon 226 or by any other useful way of exiting an application or input mode.

Figure 3:
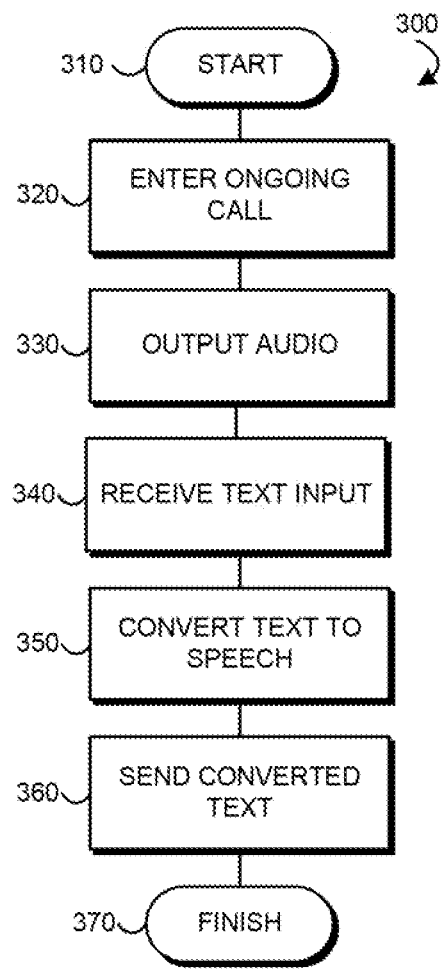
FIG. 3 is an example flowchart illustrating the operation of a first communication device according to a possible embodiment.

FIG. 3 is an example flowchart 300 illustrating the operation of a first communication device, such as the apparatus 110, according to a possible embodiment. At 310, the flowchart 300 can begin. At 320, the first communication device can enter an ongoing voice call with a second communication device. The ongoing voice call can include a voice communication path that sends audible signals from the first communication device to the second communication device or can include any other way of sending audible signals between communication devices. At 330, audio received from the second communication device can be output at the first communication device while receiving text input at the first communication device during the ongoing voice call.

At 340, text input can be received at the first communication device during the ongoing voice call. The text input can be received from a user input on the first communication device. The text input can also be received at a live call text-to-speech and audio application on the first communication device from another application on the first communication device during the ongoing voice call. At 350, the text input can be converted to speech during the ongoing voice call to generate a text-to-speech audible signal. At 360, the text-to-speech audible signal can be sent from the first communication device to the second communication device during the ongoing voice call. The text-to-speech audible signal can be sent from the first communication device to the second communication device over the voice communication path of the ongoing voice call. At 370, the flowchart 300 can end.

Figure 4:
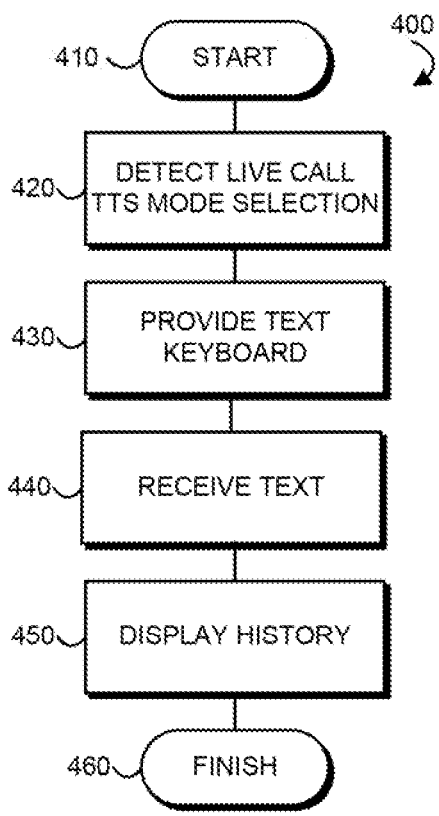
FIG. 4 is an example flowchart illustrating the operation of a first communication device according to a possible embodiment.

FIG. 4 is an example flowchart 400 illustrating the operation of a first communication device, such as the apparatus 110, according to a possible embodiment. At 410, the flowchart 400 can begin. At 420, a live call text-to-speech and audio mode selection can be detected at the first communication device. For example, a user can switch between voice communication mode and live call text-to-speech and audio mode during the ongoing voice call. As an alternate example, the user can enter the live call text-to-speech and audio mode selection before the ongoing voice call. The live call text-to-speech and audio mode selection can also be provided automatically by the first communication device, such as by detecting the first communication device is in a location where speech calls are discouraged. Such a location can be a movie theater, a library, a user selected location, or any other location where speech calls are not desired. The location can be detected using a communication device positioning system, such as based on Global Positioning System (GPS), Wireless Local Area Network (WLAN), cellular, and/or other signals that provide positioning information. The location can also be detected by the first communication device receiving a signal from the location that indicates that speech calls should not be made at the location. The live call text-to-speech and audio mode can also be enabled automatically when loud ambient noise, such as wind noise, is detected by the first communication device. In this condition, the first communication device can detect the loud ambient noise, provide a warning to the user that the live call text-to-speech and audio mode is preferred due to the loud ambient noise, and enable the live call text-to-speech and audio mode so information can be heard by the recipient despite the loud ambient noise.

The live call text-to-speech and audio mode can also provide both audio from a microphone simultaneously along with the text-to-speech audio during the ongoing voice call. This can allow a user to speak while also providing text-to-speech audible signals, such as when the user wants some information to be discreet from typing while other information is still public from speaking. This can also allow a user to provide ambient sound while also providing text-to-speech audible signals, such as to allow a user to provide ambient concert music via the microphone while also providing text-to-speech information that may otherwise be difficult for the recipient to hear over loud ambient concert music.

At 430, an alphanumeric text keyboard can be provided on a display of the first communication device in response to receiving the live call text-to-speech and audio mode selection. The alphanumeric text keyboard can be a virtual QWERTY keyboard, a virtual phone keypad, or any other keyboard that can provide alphanumeric text input. At 440, text input can be received at the first communication device via the alphanumeric text keyboard during the ongoing voice call. Alternately, the text input can be received via any other user interface. At 450, a history of previous text inputs can be displayed on the display. At 460, the flowchart 400 can end.

Figure 5:
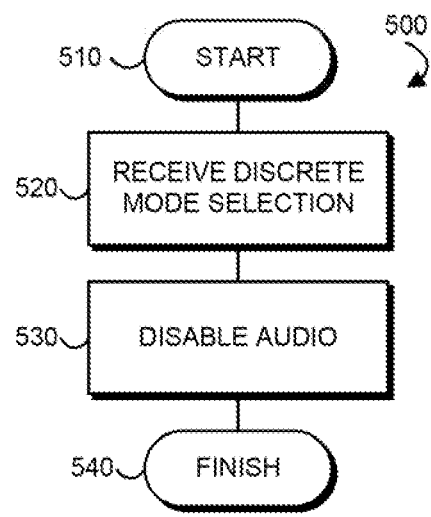
FIG. 5 is an example flowchart illustrating the operation of a first communication device according to a possible embodiment.

FIG. 5 is an example flowchart 500 illustrating the operation of a first communication device, such as the apparatus 110, according to a possible embodiment. At 510, the flowchart 500 can begin. At 520, a user selection of a discreet mode can be received at the first communication device. For example, the user selection of a discreet mode can be a dedicated selection of a discrete mode during the ongoing voice call, can be a dedicated selection of a discrete mode before the ongoing voice call, can be a user selection of a mute function while in a live call text-to-speech and audio mode, or can be any other user selection of a discrete mode where the user wants to disable audio input for at least a portion of an ongoing voice call. At 530, audio input to the first communication device can be disabled in response to receiving the user selection of the discreet mode at the first communication device. At 540, the flowchart 500 can end.

Figure 6:
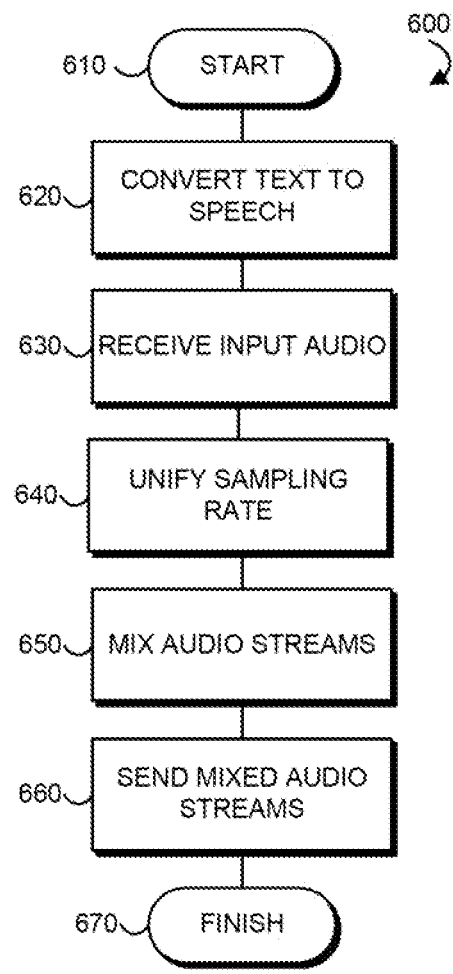
FIG. 6 is an example flowchart illustrating the operation of a first communication device according to a possible embodiment.

FIG. 6 is an example flowchart 600 illustrating the operation of a first communication device, such as the apparatus 110, according to a possible embodiment. At 610, the flowchart 600 can begin. At 620, text input can be converted to speech at the first communication device during an ongoing voice call. At 630, input audio can be received at an audio input of the first communication device during the ongoing voice call. For example, a microphone of the first communication device or an audio path for input audio may or may not be disabled while sending the text-to-speech audible signal from the first communication device to the second communication device during the ongoing voice call. This can allow for ambient sounds, such as music or meeting discussion or concert music, as well as user speech to be sent along with converted text.

At 640, a sampling rate of the text-to-speech audio stream can be unified with a sampling rate of the input audio stream if the text-to-speech audio stream sampling rate is a different sampling rate from the sampling rate of the input audio stream. For example one sampling rate can be resampled to match the other sampling rate or one or both sampling rates can be resampled to match a desired output sampling rate. At 650, an input audio stream from the input audio can be mixed with the text-to-speech audio stream from the text-to-speech audible signal to generate a mixed audio stream. According to a possible embodiment, the unified input audio stream can be mixed with the unified text-to-speech audio stream to generate the mixed audio stream. At 660, the mixed audio stream can be sent from the first communication device to the second communication device during the ongoing voice call. According to a possible embodiment, the mixed audio stream can be sent from the first communication device to the second communication device via a first communication device modem during the ongoing voice call. At 670, the flowchart 600 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 7:
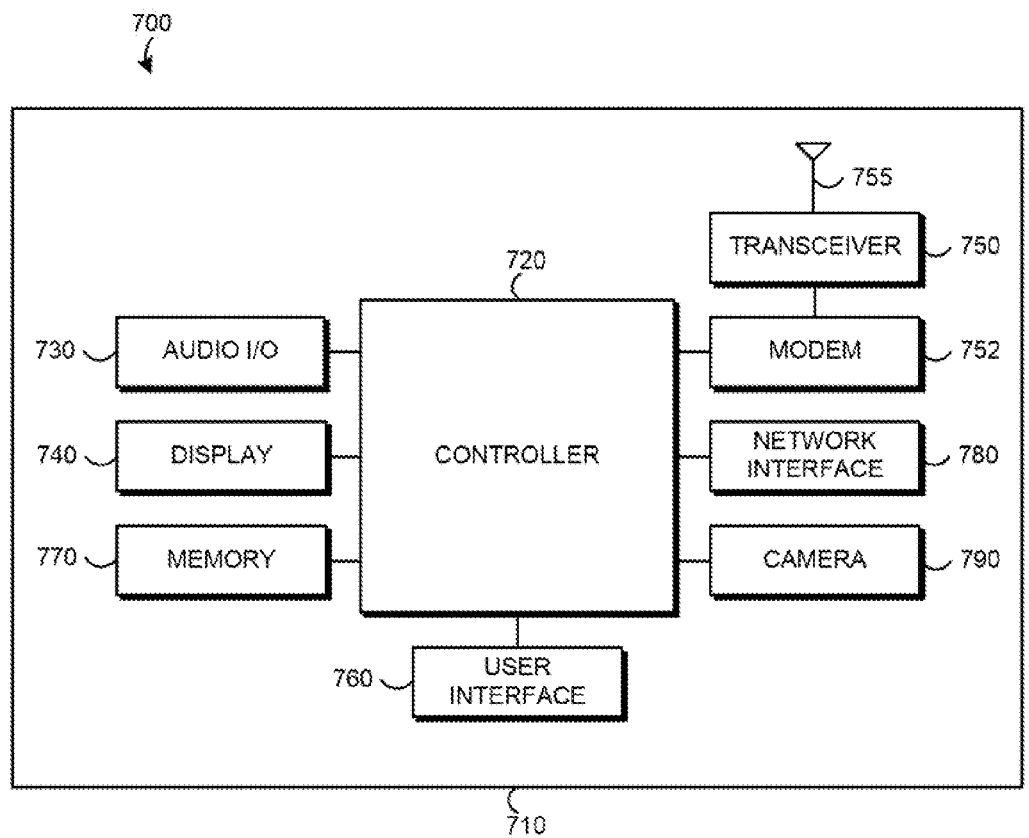
FIG. 7 is an example block diagram of an apparatus according to a possible embodiment.

FIG. 7 is an example block diagram of an apparatus 700, such as the apparatus 110, according to a possible embodiment. The apparatus 700 can include a housing 710, a controller 720 within the housing 710, audio input and output circuitry 730 coupled to the controller 720, a display 740 coupled to the controller 720, a transceiver 750 coupled to the controller 720, an antenna 755 coupled to the transceiver 750, a user interface 760 coupled to the controller 720, a memory 770 coupled to the controller 720, a network interface 780 coupled to the controller 720, and an image capture device 790 coupled to the controller 720. The apparatus 700 can also include a modem 752 coupled between the transceiver 750 and the controller 720. The apparatus 700 can perform the methods described in all the embodiments.

The display 740 can be a viewfinder, such as a liquid crystal display (LCD), a light emitting diode (LED) display, a plasma display, a projection display, a touch screen, or any other device that displays information. The transceiver 750 may include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The image capture device 790 can be a camera, a video camera, a webcam, an electronic image sensor, or any other image capture device. The network interface 780 can be a universal serial bus port, an Ethernet port, an infrared transmitter/receiver, an IEEE 1394 port, or any other interface that can connect an apparatus to a network or computer and that can transmit and receive data communication signals. The memory 770 can include a random access memory, a read only memory, an optical memory, a subscriber identity module memory, a flash memory, a removable memory, a hard drive, a cache, or any other memory that can be coupled to a wireless communication device.

The apparatus 700 or the controller 720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 770 or elsewhere on the apparatus 700. The apparatus 700 or the controller 720 may also use hardware to implement operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an electronic device and implementing the disclosed embodiments.

In operation, the transceiver 750 can connect an ongoing voice call at a first communication device with a second communication device. The first communication device can be the apparatus 700 or can be coupled to the apparatus 700. The ongoing voice call can include a voice communication path that sends audible signals from the first communication device to the second communication device. The user interface 760 can receive a user selection of a live call text-to-speech and audio mode at the first communication device. The controller 720 can disable audio input to the first communication device in response to the user interface receiving the user selection of a live call text-to-speech and audio mode at the first communication device or the controller 720 can maintain operation of audio input.

The controller 720 can detect a live call text-to-speech and audio mode selection, can provide an alphanumeric text keyboard on the display 740 in response to receiving the live call text-to-speech and audio mode selection and can receive text input via the alphanumeric text keyboard during the ongoing voice call. The controller 720 can also operate a first application that receives the text input from a second application operating on the apparatus 700 during the ongoing voice call. The controller 720 can receive text input at the first communication device during the ongoing voice call and can convert the text input to speech during the ongoing voice call to generate a text-to-speech audible signal. An audio output of the audio input and output circuitry 730 can output audio received from the second communication device at the first communication device while receiving text input at the first communication device during the ongoing voice call.

The transceiver 750 can send the text-to-speech audible signal from the first communication device to the second communication device during the ongoing voice call. For example, the transceiver 750 can send the text-to-speech audible signal from the first communication device over the voice communication path of the ongoing voice call to the second communication device. An audio input of the audio input and output circuitry 730 can receive input audio of the first communication device during the ongoing voice call. The controller 720 can mix an input audio stream from the input audio with the text-to-speech audio stream from the text-to-speech audible signal to generate a mixed audio stream. The transceiver 750 can send the mixed audio stream from the first communication device to the second communication device during the ongoing voice call. The controller 720 can also unify a sampling rate of the text-to-speech audio stream with a sampling rate of the input audio stream if the text-to-speech audio stream sampling rate is a different sampling rate from the sampling rate of the input audio stream to generate the mixed audio stream. The transceiver 750 can then send the mixed audio stream from the first communication device to the second communication device via a first communication device modem 750 during the ongoing voice call.

Figure 8:
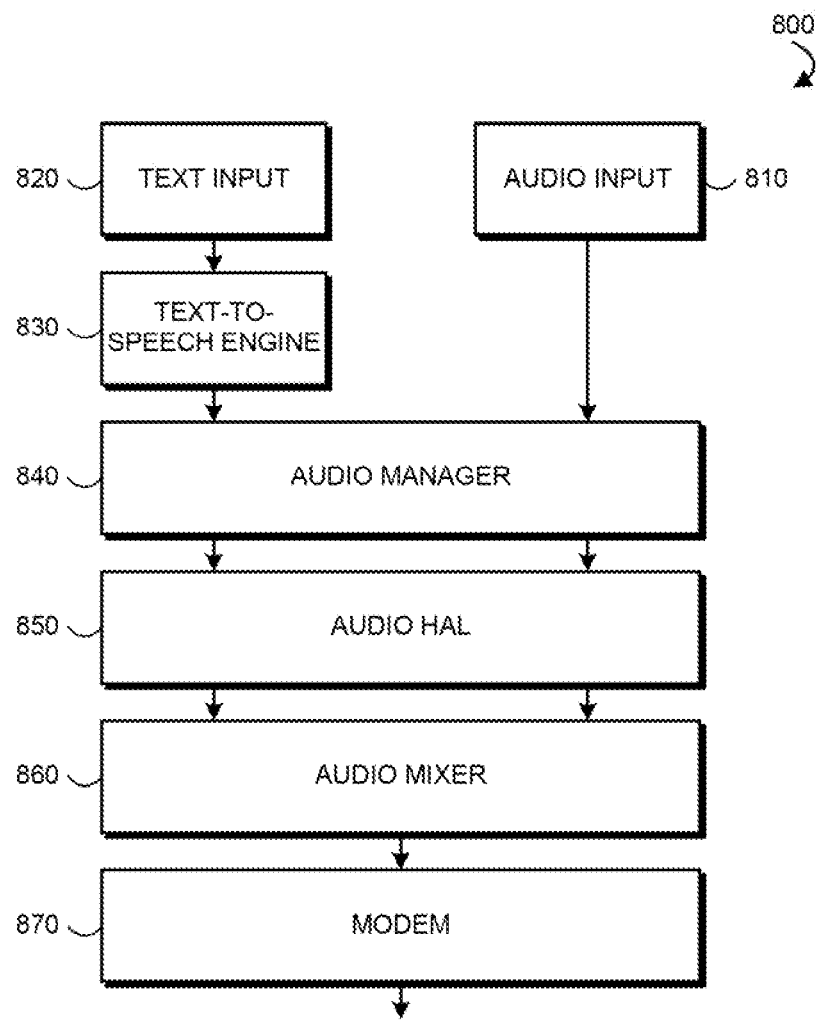
FIG. 8 is an example block diagram of an apparatus according to a possible embodiment.

FIG. 8 is an example block diagram of an apparatus 800, such as the apparatus 110 and/or the apparatus 700, according to a possible embodiment. The apparatus 800 can include an audio input 810, a text input 820, a text-to-speech engine 830, an audio manager 840, an audio hardware abstraction layer 850, an audio mixer 860, and a modem 870.

In operation, apparatus 800 can enter an ongoing voice call with a remote apparatus. The ongoing voice call can be an outgoing call originated by the apparatus 800 or can be an incoming call originated by the remote apparatus and terminated at the apparatus 800. The ongoing voice call can be over a mobile communication system, over a landline, over a wireless wide area network, and/or over any other communication system or combination of communication systems.

The audio input 810 can receive input audio, such as speech and/or ambient sounds from a microphone, and can send the input audio to the audio manager 840. The audio input or any other hardware or software can sample the input audio at a given sampling rate before sending the input audio to the audio manager. For example, the sampling rate can be an 8 kHz sampling rate, a 16 kHz sampling rate, a wideband sampling rate, or any other sampling rate.

During the ongoing call, the text input 820 can receive user text, such as through an input dialog provided by a live voice call text-to-speech application. The text input 820 can send the user text to the text-to-speech engine 830. The text-to-speech engine 830 can convert the user text to audible speech and can send the resulting audible speech audio stream to the audio manager 840. The text-to-speech engine 830 can convert the user text to audible speech at any useful sampling rate. The audio manager 840 can provide an interface between the text input 820 and the audio input 810, and the audio hardware abstraction layer 850 and the audio mixer 860. For example, the audio manager 840 can render the input audio and audible speech streams for lower level hardware. The audio manager 840 may also resample the input audio and the audible speech streams to unify their sampling rate to a desired sampling rate, such as to a sampling rate of the ongoing voice call. The input audio and the audible speech can also be resampled anywhere else on the apparatus 800. The audio hardware abstraction layer 850 can provide access to hardware resources for higher level software on the apparatus 800. The audio mixer 860 can be in a kernel driver or elsewhere on the apparatus 800. The audio mixer 860 can mix the input audio and the audible speech streams and provide the mixed audio to hardware on the apparatus 800, such as to the modem 870. The modem 870 can send the mixed audio to the ongoing voice call remote apparatus.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A computer-implemented method comprising:
    receiving, by a first device, data to establish a voice communication channel with a second device, then establishing the voice communication channel with the second device;
    receiving, after the voice communication channel with the second device has been established, a request to switch between (i) a speech audio mode in which audio received by a microphone of the first device is communicated through the voice communication channel to the second device, and (ii) a text-to-speech mode in which the microphone of the first device is muted and text that is typed into a keyboard on the first device is generated by a text-to-speech engine into speech audio that is communicated through the voice communication channel to the second device;
    after receiving the request, switching between (i) the speech audio mode in which audio received by the microphone of the first device is communicated through the voice communication channel to the second device, and (ii) the text-to-speech mode in which the microphone of the first device is muted and text that is typed into the keyboard on the first device is generated by a text-to-speech engine into speech audio that is communicated through the voice communication channel to the second device;
    after switching between (i) the speech audio mode in which audio received by the microphone of the first device is communicated through the voice communication channel to the second device, and (ii) the text-to-speech mode in which the microphone of the first device is muted and text that is typed into the keyboard on the first device is generated by a text-to-speech engine into speech audio that is communicated through the voice communication channel to the second device, receiving text that is typed into the keyboard on the first device;
    generating, by the text-to-speech engine, the speech audio based on the text; and
    transmitting the speech audio to the second device over the voice communication channel.

2. The method of claim 1, wherein:
    the request is a request to switch from (i) the speech audio mode in which audio received by the microphone of the first device is communicated through the voice communication channel to the second device to (ii) the text-to-speech mode in which the microphone of the first device is muted and text that is typed into the keyboard on the first device is generated by a text-to-speech engine into speech audio that is communicated through the voice communication channel to the second device, and
    the method comprises:
        after receiving the request, providing, for display on the first device, a keyboard.

3. The method of claim 1, wherein:
    the request is a request to switch from (i) the speech audio mode in which audio received by the microphone of the first device is communicated through the voice communication channel to the second device to (ii) the text-to-speech mode in which the microphone of the first device is muted and text that is typed into the keyboard on the first device is generated by a text-to-speech engine into speech audio that is communicated through the voice communication channel to the second device, and
    the method comprises:
        after receiving the request, preventing audio received by the microphone of the first device from being transmitted to the second device.

4. The method of claim 1, wherein:
    the request is a request to switch from (i) the speech audio mode in which audio received by the microphone of the first device is communicated through the voice communication channel to the second device to (ii) the text-to-speech mode in which the microphone of the first device is muted and text that is typed into the keyboard on the first device is generated by a text-to-speech engine into speech audio that is communicated through the voice communication channel to the second device, and
    the method comprises:
        after receiving the request, providing, for display on the first device, previous typed inputs.

5. The method of claim 1, wherein the request is received from a user of the first device.

6. The method of claim 1, comprising:
    determining, by an location application running on the first device, a location of the first device; and
    determining, by the location application, that the location corresponds to a location from a group of predetermined locations,
    wherein the request is received from the location application.

7. The method of claim 1, comprising:
    determining, by an ambient noise measuring application running on the first device, that ambient noise satisfies a threshold,
    wherein the request is received from the ambient noise measuring application.

8. A system comprising:

one or more computers and one or more storage devices storing instructions that are operable, when executed by the one or more computers, to cause the one or more computers to perform operations comprising:

receiving, by a first device, data to establish a voice communication channel with a second device, then establishing the voice communication channel with the second device;

receiving, after the voice communication channel with the second device has been established, a request to switch between (i) a speech audio mode in which audio received by a microphone of the first device is communicated through the voice communication channel to the second device, and (ii) a text-to-speech mode in which the microphone of the first device is muted and text that is typed into a keyboard on the first device is generated by a text-to-speech engine into speech audio that is communicated through the voice communication channel to the second device;

after receiving the request, switching between (i) the speech audio mode in which audio received by the microphone of the first device is communicated through the voice communication channel to the second device, and (ii) the text-to-speech mode in which the microphone of the first device is muted and text that is typed into the keyboard on the first device is generated by a text-to-speech engine into speech audio that is communicated through the voice communication channel to the second device;

after switching between (i) the speech audio mode in which audio received by the microphone of the first device is communicated through the voice communication channel to the second device, and (ii) the text-to-speech mode in which the microphone of the first device is muted and text that is typed into the keyboard on the first device is generated by a text-to-speech engine into speech audio that is communicated through the voice communication channel to the second device, receiving text that is typed into the keyboard on the first device;

generating, by the text-to-speech engine, the speech audio based on the text; and transmitting the speech audio to the second device over the voice communication channel.

9. The system of claim 8, wherein:

the request is a request to switch from (i) the speech audio mode in which audio received by the microphone of the first device is communicated through the voice communication channel to the second device to (ii) the text-to-speech mode in which the microphone of the first device is muted and text that is typed into the keyboard on the first device is generated by a text-to-speech engine into speech audio that is communicated through the voice communication channel to the second device, and the operations further comprise:
after receiving the request, providing, for display on the first device, a keyboard.

10. The system of claim 8, wherein:

the request is a request to switch from (i) the speech audio mode in which audio received by the microphone of the first device is communicated through the voice communication channel to the second device to (ii) the text-to-speech mode in which the microphone of the first device is muted and text that is typed into the keyboard on the first device is generated by a text-to-speech engine into speech audio that is communicated through the voice communication channel to the second device, and the operations further comprise:
after receiving the request, preventing audio received by the microphone of the first device from being transmitted to the second device.

11. The system of claim 8, wherein:

the request is a request to switch from (i) the speech audio mode in which audio received by the microphone of the first device is communicated through the voice communication channel to the second device to (ii) the text-to-speech mode in which the microphone of the first device is muted and text that is typed into the keyboard on the first device is generated by a text-to-speech engine into speech audio that is communicated through the voice communication channel to the second device, and the operations further comprise:
after receiving the request, providing, for display on the first device, previous typed inputs.

12. The system of claim 8, wherein the request is received from a user of the first device.

13. The system of claim 8, wherein the operations further comprise:

determining, by an location application running on the first device, a location of the first device; and determining, by the location application, that the location corresponds to a location from a group of predetermined locations, wherein the request is received from the location application.

14. The system of claim 8, wherein the operations further comprise:

determining, by an ambient noise measuring application running on the first device, that ambient noise satisfies a threshold, wherein the request is received from the ambient noise measuring application.

15. A non-transitory computer-readable medium storing software comprising instructions executable by one or more computers which, upon such execution, cause the one or more computers to perform operations comprising:

receiving, by a first device, data to establish a voice communication channel with a second device, then establishing the voice communication channel with the second device;

receiving, after the voice communication channel with the second device has been established, a request to switch between (i) a speech audio mode in which audio received by a microphone of the first device is communicated through the voice communication channel to the second device, and (ii) a text-to-speech mode in which the microphone of the first device is muted and text that is typed into a keyboard on the first device is generated by a text-to-speech engine into speech audio that is communicated through the voice communication channel to the second device;

after receiving the request, switching between (i) the speech audio mode in which audio received by the microphone of the first device is communicated through the voice communication channel to the second device, and (ii) the text-to-speech mode in which the microphone of the first device is muted and text that is typed into the keyboard on the first device is generated by a text-to-speech engine into speech audio that is communicated through the voice communication channel to the second device;

after switching between (i) the speech audio mode in which audio received by the microphone of the first device is communicated through the voice communication channel to the second device, and (ii) the text-to-speech mode in which the microphone of the first device is muted and text that is typed into the keyboard on the first device is generated by a text-to-speech engine into speech audio that is communicated through the voice communication channel to the second device, receiving text that is typed into the keyboard on the first device;

generating, by the text-to-speech engine, the speech audio based on the text; and transmitting the speech audio to the second device over the voice communication channel.

16. The medium of claim 15, wherein:

the request is a request to switch from (i) the speech audio mode in which audio received by the microphone of the first device is communicated through the voice communication channel to the second device to (ii) the text-to-speech mode in which the microphone of the first device is muted and text that is typed into the keyboard on the first device is generated by a text-to-speech engine into speech audio that is communicated through the voice communication channel to the second device, and the operations further comprise:

after receiving the request, providing, for display on the first device, a keyboard.

17. The medium of claim 15, wherein:

the request is a request to switch from (i) the speech audio mode in which audio received by the microphone of the first device is communicated through the voice communication channel to the second device to (ii) the text-to-speech mode in which the microphone of the first device is muted and text that is typed into the keyboard on the first device is generated by a text-to-speech engine into speech audio that is communicated through the voice communication channel to the second device, and the operations further comprise:

after receiving the request, preventing audio received by the microphone of the first device from being transmitted to the second device.

18. The medium of claim 15, wherein the request is received from a user of the first device.

19. The medium of claim 15, wherein the operations further comprise:

determining, by an location application running on the first device, a location of the first device; and determining, by the location application, that the location corresponds to a location from a group of predetermined locations, wherein the request is received from the location application.

20. The medium of claim 15, wherein the operations further comprise:

determining, by an ambient noise measuring application running on the first device, that ambient noise satisfies a threshold, wherein the request is received from the ambient noise measuring application.

* * * * *